(12) United States Patent
Wintermantel

(10) Patent No.: US 11,604,273 B2
(45) Date of Patent: Mar. 14, 2023

(54) RADAR SYSTEM FOR DETECTING THE ENVIRONMENT OF A MOTOR VEHICLE HAVING A PLASTIC ANTENNA

(71) Applicant: Conti Temic microelectronic GmbH, Nuremberg (DE)

(72) Inventor: Markus Wintermantel, Lindau (DE)

(73) Assignee: Conti Temic microelectronic GmbH, Nüremberg (DE)

( * ) Notice: Subject to any disclaimer, the term of this patent is extended or adjusted under 35 U.S.C. 154(b) by 0 days.

(21) Appl. No.: 17/007,725

(22) Filed: Aug. 31, 2020

(65) Prior Publication Data
US 2020/0400815 A1    Dec. 24, 2020

Related U.S. Application Data

(63) Continuation of application No. PCT/DE2019/200010, filed on Feb. 5, 2019.

(30) Foreign Application Priority Data

Mar. 1, 2018  (DE) ..................... 10 2018 203 106.1

(51) Int. Cl.
*G01S 13/931*  (2020.01)
*G01S 13/87*  (2006.01)
(Continued)

(52) U.S. Cl.
CPC ............ *G01S 13/931* (2013.01); *G01S 13/87* (2013.01); *H01Q 1/3283* (2013.01)

(58) Field of Classification Search
CPC .................................................. G06K 19/0704
See application file for complete search history.

(56) References Cited

U.S. PATENT DOCUMENTS 6,050,494 A * 4/2000 Song .................. G06K 19/0704
349/1
6,097,271 A * 8/2000 Kozakoff ................. H01Q 1/38
428/323
(Continued)

FOREIGN PATENT DOCUMENTS

DE      19859999 C1    8/2000
DE   102014200660 A1   1/2012
(Continued)

OTHER PUBLICATIONS

International Search Report and Written Opinion dated May 21, 2019 from corresponding International Patent Application No. PCT/DE2019/200010.
(Continued)

*Primary Examiner* — Bernarr E Gregory

(57) ABSTRACT

A radar system for detecting the environment of a motor vehicle includes an antenna assembly comprising plastic and including one or more individual antennas for transmitting and/or receiving radar signals. A circuit board includes at least one area that is permeable by radar waves. At least one high-frequency component is coupled to one side of the circuit board and includes at least one radiating element for direct emission or receipt of radar waves in the direction of the circuit board in the least one area that is permeable by radar waves. The antenna assembly is disposed on the other side of the circuit board opposite the at least one high-frequency component. The antenna assembly includes a coupling/decoupling point disposed in the at least one area of the circuit board permeable by radar waves.

7 Claims, 4 Drawing Sheets

(51) Int. Cl.
*H01Q 1/32* (2006.01)
*G01S 13/00* (2006.01)
*H01Q 1/00* (2006.01)

(56) References Cited

U.S. PATENT DOCUMENTS

| | | | | |
|---|---|---|---|---|
| 6,756,936 | B1 * | 6/2004 | Wu | G01S 7/032 |
| | | | | 342/28 |
| 6,873,250 | B2 | 3/2005 | Viana et al. | |
| 7,126,541 | B2 * | 10/2006 | Mohamadi | H01Q 3/26 |
| | | | | 343/700 MS |
| 7,733,265 | B2 * | 6/2010 | Margomenos | G01S 7/032 |
| | | | | 343/700 R |
| 8,922,435 | B2 * | 12/2014 | Fontecchio | G06K 19/07773 |
| | | | | 343/700 MS |
| 9,318,449 | B2 * | 4/2016 | Hasch | H01L 21/4846 |
| 9,887,449 | B2 * | 2/2018 | Qiang | G01S 7/03 |
| 9,917,372 | B2 * | 3/2018 | Tong | G01S 7/03 |
| 10,225,925 | B2 * | 3/2019 | Qiang | G01S 7/03 |
| 10,270,186 | B2 * | 4/2019 | Teshima | H01Q 3/24 |
| 10,921,420 | B2 * | 2/2021 | Trotta | G01S 7/032 |
| 11,011,816 | B2 * | 5/2021 | Shi | G01S 13/931 |
| 2003/0024633 | A1 | 2/2003 | Ogura | |
| 2003/0080836 | A1 * | 5/2003 | Nagaishi | H01Q 21/0087 |
| | | | | 333/247 |
| 2005/0069277 | A1 * | 3/2005 | Nakazawa | H01Q 21/0087 |
| | | | | 385/147 |
| 2009/0079648 | A1 * | 3/2009 | Matsuo | H01Q 21/0087 |
| | | | | 343/771 |
| 2012/0013499 | A1 | 1/2012 | Hayata | |
| 2013/0050016 | A1 * | 2/2013 | Kim | H01Q 9/285 |
| | | | | 342/195 |
| 2018/0034140 | A1 | 2/2018 | Chen | |

FOREIGN PATENT DOCUMENTS

| | | | |
|---|---|---|---|
| DE | 102015223243 | A1 | 5/2017 |
| EP | 1274149 | A2 | 1/2003 |
| EP | 1983614 | A1 | 10/2008 |
| JP | 2001156536 | A | 6/2001 |
| JP | 2003086728 | A | 3/2003 |
| JP | 2014072573 | A | 4/2014 |
| JP | 2015109570 | A | 6/2015 |
| WO | WO02/063334 | A2 * | 8/2002 ........... G01D 5/2405 |

OTHER PUBLICATIONS

German Search Report dated Jan. 10, 2019 for corresponding German Patent Application No. 10 2018 203 106.1.
Notice or Reasons for Refusal dated Dec. 14, 2022 from corresponding Japanese patent application No. 2020-541652.
Notice or Reasons for Refusal dated Dec. 14, 2022 from corresponding Japanese patent application No. 2020-541652 (Translated).

* cited by examiner

RADAR SYSTEM FOR DETECTING THE ENVIRONMENT OF A MOTOR VEHICLE HAVING A PLASTIC ANTENNA

CROSS REFERENCE TO RELATED APPLICATION

This application is a continuation of International application No. PCT/DE2019/200010, filed Feb. 22, 2019, which claims priority to German Application DE 10 2018 203 106.1, filed Mar. 1, 2018, each of which is hereby incorporated by reference.

TECHNICAL FIELD

The technical field relates generally to radar systems for deployment with driver assistance systems in motor vehicles.

BACKGROUND

Motor vehicles are increasingly equipped with driver assistance systems which detect the surroundings with the aid of sensor systems and deduce automatic reactions of the vehicle and/or instruct, in particular warn, the driver, as a result of the traffic situation thus recognized. A distinction is made between comfort and safety functions.

FSRA (Full Speed Range Adaptive Cruise Control) plays the most important role in current development, as a comfort function. The vehicle regulates the ego-speed to the desired speed predefined by the driver if the traffic situation permits this; otherwise, the ego-speed is automatically adapted to the traffic situation.

Safety functions now exist in many and diverse forms. One group is made up of functions for reducing the braking or stopping distance in emergency situations right up to autonomous emergency braking. A further group includes lane change functions: they warn the driver or intervene in the steering if the driver would like to perform a dangerous lane change, that is to say if a vehicle is located on the adjacent lane either in the blind spot (referred to as BSD—"Blind Spot Detection") or is approaching quickly from behind (LCA—"Lane Change Assist").

However, in the foreseeable future, the driver will no longer only be assisted, but rather the job of the driver will increasingly be performed autonomously by the vehicle itself, i.e. the driver will be increasingly replaced; this phenomenon is known as autonomous driving.

Radar sensors are deployed, including frequently in fusion with other technology's sensors such as e.g. camera sensors, for systems of the type described above. The advantage of radar sensors is that they work reliably, even in poor weather conditions, and, in addition to the distance of objects, they can also directly measure the radial relative speed thereof by means of the Doppler effect. 24 GHz, 77 GHz and 79 GHz are deployed as transmitting frequencies Due to the increasing functional scope of such systems, the requirements, in particular in terms of the maximum detection range, are constantly increasing. Even so, a considerable fall in price is taking place at the same time.

The central element of each radar sensor is the antenna; it is key in defining the performance and price of the sensor. Currently, the antennas are mostly realized in planar technology on a high-frequency circuit board, e.g., as patch antennas. The disadvantages of such an antenna realization are, on the one hand, the losses in the supply cables and antennas themselves (which limits the range) and, on the other hand, the high costs of such a circuit board (in particular because special high frequency-capable substrates are required, which are expensive and require elaborate processing).

As such, it is desirable to present a radar system having a reduce size, improved performance, and lower price. In addition, other desirable features and characteristics will become apparent from the subsequent summary and detailed description, and the appended claims, taken in conjunction with the accompanying drawings and this background.

SUMMARY

According to one exemplary embodiment, a radar system for detecting the environment of a motor vehicle includes an antenna made of plastic, wherein the plastic antenna has one or more individual antennas for transmitting and/or receiving radar signals, and a circuit board having at least one high-frequency component having at least one element for direct emission or receipt. The system is distinguished by the fact that the plastic antenna is arranged on the side of the circuit board opposite the at least one high-frequency component, the at least one emitting or receiving element is designed such that it emits in the direction of the circuit board or receives from the direction of the circuit board, the circuit board is permeable by radar waves in the region of the at least one emitting or receiving element, and a coupling or decoupling point on the plastic antenna is located on the at least one permeable location of the circuit board.

The plastic antenna is preferably designed as a waveguide antenna. Thanks to the radar system according to the invention, a direct feeding of the plastic antenna is preferably possible. This is in particular achieved in that the radar system has a high-frequency component or a high-frequency chip having direct emission from a lower side through a circuit board into a waveguide antenna made of plastic.

The at least one location permeable by radar waves is advantageously designed by a hole in the circuit board having metallized side walls.

In addition, the at least one location permeable by radar waves in the circuit board can also be realized in that the circuit board has an aperture, in which or through which a waveguide extension of the plastic antenna projects.

It is also conceivable that the at least one location permeable by radar waves in the circuit board is realized in that no metallization is located there on and/or between carrier material layers of the circuit board and the location may be edged with vias.

Solder beads may be arranged around the at least one emitting or receiving element in the case of the radar system on a lower side of the at least one high-frequency component such that a lateral escaping of the radiation in an intermediate space of the high-frequency component and circuit board is reduced or prevented. In particular, a coupling between multiple transitions can thus be avoided.

Further, the radar system may have a good heat conducting component part, in particular a metal lid. The component part is advantageously arranged on the same side of the circuit board as the at least one high-frequency component. A thermal contact is produced, in particular by way of thermal heatsink paste, between the high-frequency component and the component part.

At least one component is advantageously arranged on the side of the circuit board facing the plastic antenna. The component can be covered by a cavity in the plastic antenna, which may be metallized.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
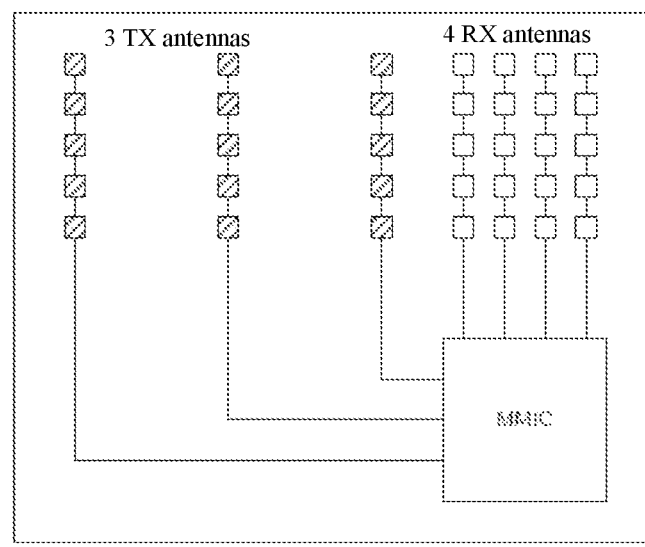
FIG. 1 shows a high-frequency circuit board of a radar system according to the prior art.

Nowadays, antennas for radar systems for detecting the environment are mostly realized as planar antennas on a high-frequency circuit board. In FIG. 1, a high-frequency circuit board having a high-frequency component, a so-called MIMIC (Monolithic Microwave Integrated Circuit) and having three (3) transmitting antennas (TX) as well as four (4) receiving antennas (RX) is shown, wherein the antennas are each composed of multiple individual emitters. The antennas are realized as planar patch antennas.

The antennas and their supply cables from the high-frequency chip require a special substrate with material data suitable for high frequency (e.g., defined thickness, defined dielectric constant, very low loss angle) on the upper layer of the high-frequency circuit board. In particular, the material costs of this special substrate and its processing (including due to the necessary high structural accuracies) lead to costs increased by factors, compared to a pure low-frequency circuit board of similar size and a similar number of layers. However, in addition to the costs, the signal losses in the antennas and their supply cables are also disadvantageous. For a transmitting and a receiving antenna including supply cables, power losses of approximately 6 dB are typical. Such a reduced sensor sensitivity results in a maximum sensor range which is reduced by 30%.

Figure 2:
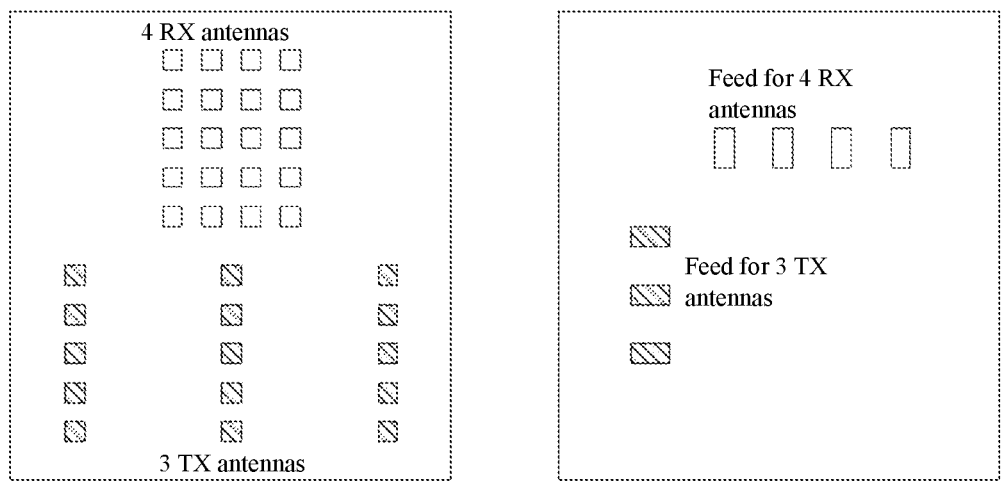
FIG. 2 shows the upper side (on the left) and the lower side (on the right) of a cuboid waveguide antenna made of plastic.

Due to the indicated disadvantages of circuit board-based antennas, so-called waveguide antennas are now being considered more and more. Here, antennas and their supply cables are realized with the aid of waveguides which, in the simplest case, constitute rectangular hollow spaces having metal or metallized walls. Such an antenna can be executed as a cuboid plastic part and is, for example, shown in FIG. 2. As shown in FIG. 2, there are openings for emission on the upper side, openings for feeding on the lower side and within hollow space structures, wherein all of the surfaces (externally and internally) are metallized. Such an antenna is typically composed of multiple layers, which, for example, also permits a crossing of high-frequency connections. Since the arrangement of the individual antennas is now independent of the chip, as depicted in FIG. 2, the three (3) transmitting antennas can be arranged, e.g., beneath the four (4) receiving antennas (in the case of the circuit board-based antenna according to FIG. 1, they are arranged next to one another). Since the chip now no longer lies on the antenna plane, smaller sensors can be realized.

In addition to injection molding, three-dimensional printing is now also considered as a production method for plastic antennas. Waveguide antennas produced from metallized plastic have considerable cost advantages compared with a solid metal realization. Challenges in the case of waveguide antennas made of plastic include the necessary accuracy of the structures and the precisely fitting connection of the multiple plastic layers—however, new production methods are now making this possible.

Figure 3:
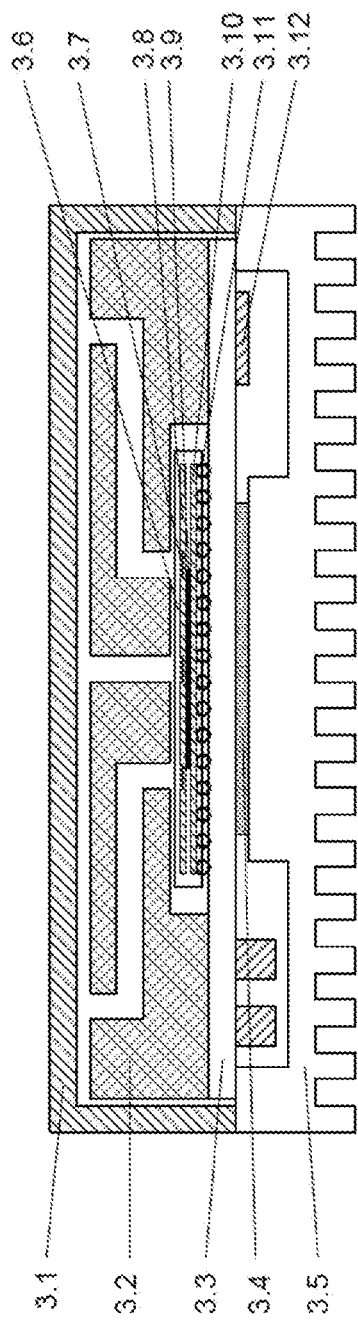
FIG. 3 shows a section through a radar sensor with direct emission from an upper side of a high-frequency chip into a waveguide antenna.

However, even when using plastic antennas, there are still high-frequency signals on the circuit board nowadays, in particular from the chip output up to a structure emitting into the waveguide antenna. Due to this, the circuit board here is also relatively expensive. For this reason, efforts are being made to emit directly from the upper side of the high-frequency chip into the waveguide antenna; this is depicted in FIG. 3. Admittedly, this approach does have some disadvantages:

- the transition from the chip 3.6 into the waveguide antenna 3.2 is tolerance-critical. The tolerance chain is long including, for example, the following: soldered joint of the chip, thickness of the chip, tolerances of the antenna;
- direct contact of the antenna with the chip (both during production and over the lifetime), as a result of which the chip can be damaged;
- chip 3.6 requires, in addition to the silicon core 3.9, not only a so-called redistribution layer 3.10 at the bottom, but also a further redistribution layer 3.8 for the emission elements 3.7 at the top;
- the thermal dissipation of the chip is unsatisfactory, since the plastic antenna 3.2 and the front plastic housing 3.1 thermally isolate, so that heat from the chip can almost exclusively only be dissipated via the circuit board 3.3. The thermal coupling of the chip to the metal back of the sensor 3.5 by way of the thermal heatsink paste 3.4 is therefore not direct, but only possible through the circuit board.

Figure 4:
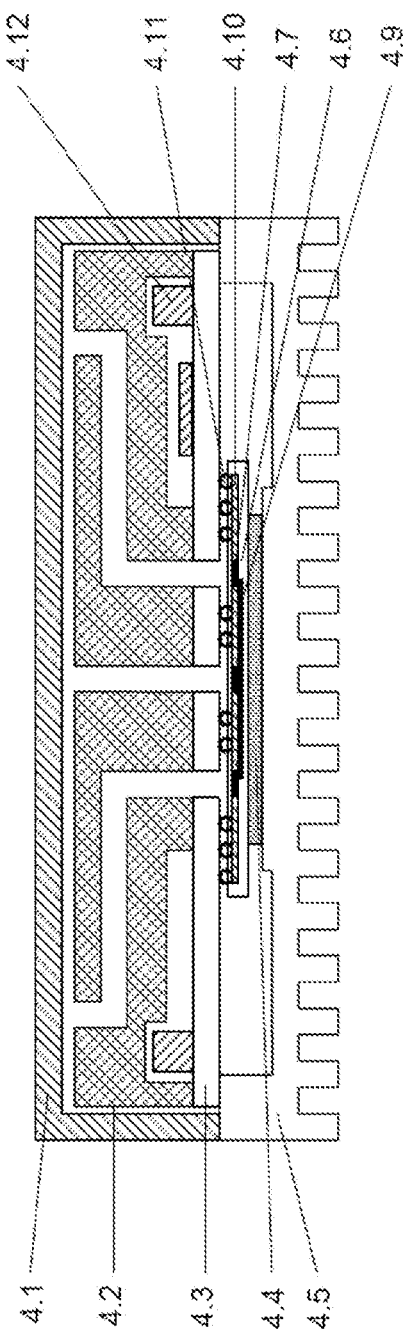
FIG. 4 shows a section through a radar sensor with direct emission from a lower side of a high-frequency chip through an opening in a circuit board into a waveguide antenna which is located on the opposite side of the circuit board.

In order to circumvent said disadvantages, the construction in accordance with FIG. 4, inter alia, is therefore proposed in the present case. Emitting elements 4.7 are arranged on the lower side of the chip 4.6, wherein the chip 4.6 is located on the side of the circuit board 4.3 opposite the plastic antenna 4.2. From the chip 4.6, the plastic antenna 4.2 is fed by the circuit board 4.3 which is permeable by the radar waves at these locations; high-frequency transitions from the chip 4.6 into the plastic antenna 4.2 are therefore realized through the circuit board 4.3.

As depicted in FIG. 4, the permeability of the circuit board 4.3 can be simply realized by a hole in the circuit board 4.3, wherein the side walls of the circuit board 4.3 are then metallized at this location such that a type of waveguide is realized in each case.

Figure 5:
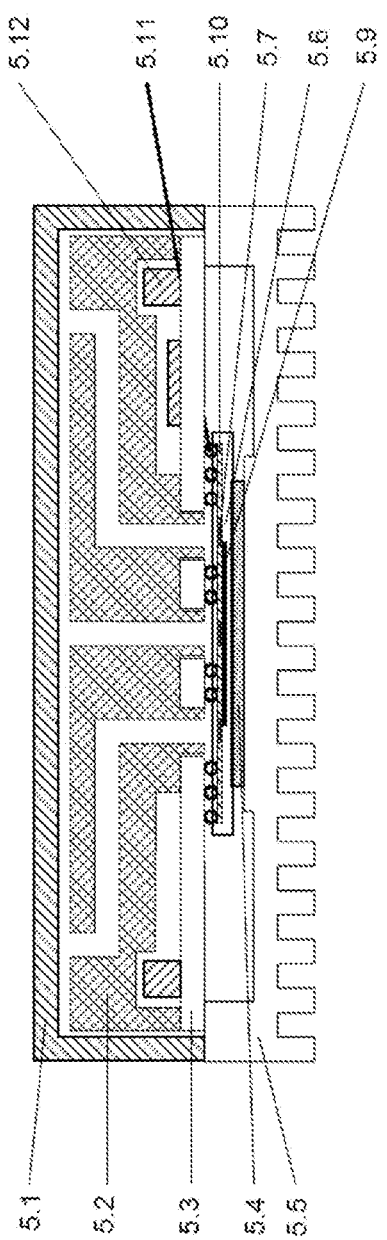
FIG. 5 shows a section through a radar sensor with direct emission from a lower side of a high-frequency chip into a waveguide antenna on the opposite antenna side, wherein waveguide extensions of the waveguide antenna project through circuit board apertures in the direction of the high-frequency chip.

Alternatively, as shown for example in FIG. 5, the transitions can also be realized such that there are apertures in the circuit board 5.3 and waveguide extensions of the plastic antenna 5.2 project in these apertures or through said apertures. Another approach for permeable transitions in the circuit board consists of omitting the metallizations there on or between the carrier material layers of the circuit board and edging said regions with vias.

In order to prevent radiation in the intermediate space of the high-frequency component and circuit board escaping at the transitions, which would, on the one hand, lead to a loss in performance and, on the other hand, to coupling between the transitions, solder beads (balls) can be placed around the transitions and, thus, between the transitions. This is depicted, for example, in FIG. 4 where a chip executed as a so-called ball grid array having balls 4.11 is shown. When these solder beads 4.11 are configured and arranged in a suitable manner, they can constitute a band-rejection filter for the high frequency used and, consequently, act as an EBG (Electromagnetic Band-Gap) structure.

A further advantage of the arrangement according to FIG. 4 is that it allows a good thermal contacting of the chip 4.6, which has a high current consumption and, thus, self-heating. To this end, the chip 4.6—as depicted—is coupled by way of thermal heatsink paste 4.4 to the cover 4.5 on the back of the sensor, which can consist of aluminum and has cooling ribs.

As is in addition depicted in FIG. 4, components 4.12 can be fitted on the side of the circuit board 4.3 facing the plastic antenna 4.2, which components are covered by cavities in the plastic antenna 4.2. Since the surface of the plastic antenna 4.2 is metallized anyway, an electrical shielding of components can be realized without additional costs.

It should be appreciated that a radar system both transmits and receives. To simplify matters, both are frequently not explicitly stated or distinguished in the above description. For example, "radiation/emission" is referred to in the case of the antenna or the elements on the chip—in the case of receiving antennas, this of course means "receiving"; and if "feeding" is referred to in the case of the waveguide on the back of the antenna, this then means "decoupling" in the case of receiving antennas.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A radar system for detecting the environment of a motor vehicle, comprising:
   an antenna assembly comprising plastic and including one or more individual antennas;
   a circuit board having at least one area that is permeable by radar waves;
   at least one high-frequency component coupled to one side of the circuit board; and
   at least one radiating element for direct emission or receipt of radar waves in the direction of the circuit board in the least one area that is permeable by radar waves; wherein
   the at least one radiating element is disposed on the other side of the circuit board opposite the at least one high-frequency component; and
   wherein the at least one area of the circuit board permeable by radar waves includes a hole defined by the circuit board, extending through the circuit board, and having metallized side walls.

2. The radar system according to claim 1, wherein the at least one area of the circuit board permeable by radar waves in the circuit board includes an aperture defined by the circuit board and a waveguide extension projects through the aperture.

3. The radar system according to claim 1, wherein solder beads are arranged around the at least one emitting or receiving element on a lower side of the at least one high-frequency component such that a lateral escaping of the radiation in an intermediate space of the high-frequency component and circuit board is reduced or prevented, in particular in order to avoid a coupling between multiple transitions.

4. The radar system according to claim 1, wherein a good heat conducting component part is arranged on the same side of the circuit board as the at least one high-frequency component, and a thermal contact is produced by a thermal heatsink paste between the high-frequency component and the component part.

5. The radar system according to claim 1,
   wherein at least one component is arranged on the side of the circuit board facing the antenna assembly, wherein the component is covered by a cavity in the antenna assembly.

6. A radar system for detecting the environment of a motor vehicle, comprising:
   an antenna assembly comprising plastic and including one or more individual antennas;
   a circuit board having at least one area that is permeable by radar waves;
   at least one high-frequency component coupled to one side of the circuit board; and
   at least one radiating element for direct emission or receipt of radar waves in the direction of the circuit board in the least one area that is permeable by radar waves;
   wherein the at least one radiating element is disposed on the other side of the circuit board opposite the at least one high-frequency component; and
   wherein the at least one location permeable by radar waves in the circuit board is realized in that no metallization is located thereon and/or between carrier material layers of the circuit board and the location is edged with vias.

7. A radar system for detecting the environment of a motor vehicle, comprising:
   an antenna assembly comprising plastic and including one or more individual antennas;
   a circuit board having at least one area that is permeable by radar waves;
   at least one high-frequency component coupled to one side of the circuit board; and
   at least one radiating element for direct emission or receipt of radar waves in the direction of the circuit board in the least one area that is permeable by radar waves;
   wherein the at least one radiating element is disposed on the other side of the circuit board opposite the at least one high-frequency component; and
   wherein solder beads are arranged around the at least one emitting or receiving element on a lower side of the at least one high-frequency component such that a lateral escaping of the radiation in an intermediate space of the high-frequency component and circuit board is reduced or prevented, in particular in order to avoid a coupling between multiple transitions.

* * * * *